US010479136B2

(12) United States Patent
McKinnon (10) Patent No.: US 10,479,136 B2
(45) Date of Patent: Nov. 19, 2019

(54) WHEEL FRAME COMPONENT (71) Applicant: Rotacaster Wheel Limited, Tighes Hill (AU)

(72) Inventor: Peter R. McKinnon, Merewether (AU)

(73) Assignee: Rotacaster Wheel Limited, Tighes Hill (AU)

( * ) Notice: Subject to any disclaimer, the term of this patent is extended or adjusted under 35 U.S.C. 154(b) by 113 days.

(21) Appl. No.: 15/542,063

(22) PCT Filed: Jan. 6, 2016

(86) PCT No.: PCT/AU2016/000001
§ 371 (c)(1),
(2) Date: Jul. 6, 2017

(87) PCT Pub. No.: WO2016/109867
PCT Pub. Date: Jul. 14, 2016

(65) Prior Publication Data
US 2017/0361648 A1 Dec. 21, 2017

(30) Foreign Application Priority Data
Jan. 6, 2015 (AU) ................................ 2015900018

(51) Int. Cl.
*B60B 19/00* (2006.01)
*B60B 19/12* (2006.01)
(52) U.S. Cl.
CPC ............ *B60B 19/003* (2013.01); *B60B 19/12* (2013.01); *B60B 2900/112* (2013.01);
(Continued)
(58) Field of Classification Search
CPC .............................. B60B 19/003; B60B 19/12
(Continued)

(56) References Cited

U.S. PATENT DOCUMENTS 1,326,679 A  12/1919 Macbeth
1,913,204 A   6/1933 Larzelere
(Continued)

FOREIGN PATENT DOCUMENTS

AU       561380 B2   5/1987
AU   2001291482 B2   6/2005
(Continued)

OTHER PUBLICATIONS

Design U.S. Appl. No. 29/519,548, filed Mar. 15, 2015.
(Continued)

Primary Examiner — Kip T Kotter
(74) Attorney, Agent, or Firm — TraskBritt (57) ABSTRACT A multiple directional wheel including a wheel frame comprising identical component parts. Each of the wheel frame components comprise: a hub having a main axis about which the multiple directional wheel is adapted to rotate; a hub rim radially surrounding the hub; a first plurality of peripheral roller supporting arms ("first arms") radially extending from the hub rim and aligned in a first plane; and a second plurality of peripheral roller supporting arms, each member arm of the second plurality of peripheral roller supporting arms having a radially inner base and being circumferentially offset with respect to diagonally adjacent members of the first plurality of peripheral roller supporting arms. Each of the wheel frame components further comprise a plurality of beams corresponding to the number of member arms of the second plurality of peripheral roller supporting arms, each respective beam extending from the hub rim to a corresponding inner base of a member arm of the second plurality of peripheral roller supporting arms, and a plurality of spigots extending from each corresponding one of the plurality of beams or the inner bases. The second plurality of peripheral roller supporting arms lie in a second plane
(Continued)

normal to the main axis, spaced from, and parallel to, the first plane; and each of the spigots from one of the wheel frame components is received in a recess formed in a facing surface of a complementary one of the wheel frame components to join the wheel frame components to form the wheel frame.

14 Claims, 10 Drawing Sheets

(52) U.S. Cl.
CPC ... *B60B 2900/321* (2013.01); *B60B 2900/325* (2013.01); *B60B 2900/351* (2013.01); *B60B 2900/551* (2013.01)

(58) Field of Classification Search
USPC ....................................................... 301/5.23
See application file for complete search history.

(56) References Cited

U.S. PATENT DOCUMENTS

| | | | |
|---|---|---|---|
| 2,464,653 A | 3/1949 | Phipps | |
| 3,040,371 A | 6/1962 | Rice et al. | |
| 3,363,735 A | 1/1968 | Hotchkiss | |
| 3,465,843 A | 9/1969 | Guinot | |
| 3,621,961 A | 11/1971 | Stumpf | |
| 3,647,236 A | 3/1972 | Hayes | |
| 3,655,212 A | 4/1972 | Krass | |
| 3,666,285 A | 5/1972 | Fertig | |
| 3,789,947 A | 2/1974 | Blumrich | |
| 3,878,927 A | 4/1975 | Murakami | |
| 3,882,885 A | 5/1975 | McCain | |
| 3,944,094 A | 3/1976 | Compton | |
| 3,961,694 A | 6/1976 | Murakami | |
| 4,006,810 A | 2/1977 | Kornylak | |
| 4,223,753 A | 9/1980 | Bradbury et al. | |
| 4,335,889 A | 6/1982 | Cather, Jr. et al. | |
| 4,460,189 A | 7/1984 | Goff et al. | |
| 4,598,782 A | 7/1986 | Ilon et al. | |
| 4,681,330 A | 7/1987 | Misawa | |
| 4,715,460 A | 12/1987 | Smith | |
| D294,074 S | 2/1988 | Sogge | |
| 4,909,638 A | 3/1990 | Muto | |
| 4,926,952 A | 5/1990 | Farnam | |
| D309,254 S | 7/1990 | Guile | |
| 4,981,203 A | 1/1991 | Kornylak | |
| 5,013,166 A | 5/1991 | Domer | |
| 5,035,314 A | 7/1991 | Kornylak | |
| D318,791 S | 8/1991 | Guile | |
| 5,072,821 A | 12/1991 | Kruse et al. | |
| 5,118,124 A | 6/1992 | Storay | |
| 5,213,176 A | 5/1993 | Oroku et al. | |
| D340,342 S | 10/1993 | Nummelin et al. | |
| 5,323,867 A | 6/1994 | Griffin et al. | |
| 5,404,984 A | 4/1995 | Hagman | |
| 5,415,215 A | 5/1995 | Covert et al. | |
| 5,445,399 A | 8/1995 | Salvucci | |
| 5,536,074 A | 7/1996 | Hsu et al. | |
| 5,779,251 A | 7/1998 | Meier et al. | |
| 5,947,491 A | 9/1999 | Meier et al. | |
| 5,971,693 A | 10/1999 | Story et al. | |
| D426,692 S | 6/2000 | Swanink | |
| 6,086,327 A | 7/2000 | Mack et al. | |
| D435,437 S * | 12/2000 | Guile | .......................... D8/375 |
| D439,721 S | 3/2001 | Swanink | |
| 6,283,902 B1 | 9/2001 | Bakoledis | |
| 6,315,109 B1 | 11/2001 | Dean | |
| 6,340,065 B1 | 1/2002 | Harris | |
| 6,341,788 B1 | 1/2002 | Ciccone | |
| 6,357,765 B1 | 3/2002 | Heien | |
| 6,364,328 B1 | 4/2002 | Stahler, Sr. | |
| 6,386,763 B1 | 5/2002 | Mack et al. | |
| 6,394,203 B1 | 5/2002 | Harris | |
| 6,547,340 B2 | 4/2003 | Harris | |
| 6,587,707 B2 * | 7/2003 | Nehrke | ............. G01R 33/5676 324/306 |
| 6,619,823 B2 | 9/2003 | Dai | |
| 6,755,405 B2 | 6/2004 | Kammel et al. | |
| 6,796,618 B2 | 9/2004 | Harris | |
| 6,857,707 B2 | 2/2005 | Guile | |
| 6,923,457 B2 | 8/2005 | Nogaki | |
| D516,767 S | 3/2006 | Layne | |
| 7,083,174 B2 | 8/2006 | Kane | |
| 7,219,903 B2 | 5/2007 | Grooters et al. | |
| 7,318,628 B2 | 1/2008 | Guile | |
| 7,431,148 B2 | 10/2008 | Li et al. | |
| 7,458,726 B2 | 12/2008 | Seilheimer | |
| 7,500,682 B1 | 3/2009 | Del Marmol | |
| 7,566,102 B2 | 7/2009 | Guile | |
| 7,621,355 B2 | 11/2009 | Chu et al. | |
| 7,641,288 B1 | 1/2010 | Baker et al. | |
| 7,878,284 B1 | 2/2011 | Shultz | |
| 7,980,335 B2 | 7/2011 | Potter | |
| D658,843 S | 5/2012 | Wedemeyer | |
| D676,214 S | 2/2013 | McKinnon et al. | |
| 8,496,299 B2 | 7/2013 | Brudniok | |
| 8,556,279 B2 | 10/2013 | McKinnon | |
| 9,216,612 B2 * | 12/2015 | Zdrahal | ................... B60B 11/02 |
| 9,248,698 B2 | 2/2016 | McKinnon et al. | |
| 2002/0057010 A1 | 5/2002 | Harris | |
| 2002/0186905 A1 | 12/2002 | Kammel et al. | |
| 2003/0037410 A1 * | 2/2003 | Yamaguchi | ........... B60B 19/003 16/48 |
| 2004/0004390 A1 | 1/2004 | Guile | |
| 2004/0256818 A1 | 12/2004 | Amsili | |
| 2005/0134106 A1 | 6/2005 | Guile | |
| 2007/0096541 A1 | 5/2007 | Guile | |
| 2008/0018167 A1 | 1/2008 | Fuji | |
| 2009/0278325 A1 | 11/2009 | Geels et al. | |
| 2010/0187779 A1 | 7/2010 | Potter | |
| 2011/0119863 A1 * | 5/2011 | Ha | ............................ A47L 5/28 15/412 |
| 2012/0019048 A1 | 1/2012 | Mckinnon et al. | |
| 2012/0279830 A1 | 11/2012 | Reidhaar | |
| 2015/0151572 A1 * | 6/2015 | Parrott | .................... B60B 19/12 301/5.23 |
| 2016/0193871 A1 | 7/2016 | McKinnon et al. | |

FOREIGN PATENT DOCUMENTS

| | | |
|---|---|---|
| CA | 2622950 A1 | 3/2007 |
| CN | 101417586 A | 4/2009 |
| CN | 201342911 Y | 11/2009 |
| CN | 201881894 U | 6/2011 |
| CN | 202011305 U | 10/2011 |
| CN | 102700358 A | 10/2012 |
| DE | 3702660 A1 | 8/1988 |
| GB | 927890 A | 6/1963 |
| GB | 1408820 A | 10/1975 |
| GB | 2242173 A | 9/1991 |
| GB | 2242858 A | 10/1991 |
| GB | 2408692 A | 6/2005 |
| JP | 11227404 A | 8/1999 |
| JP | 2000335726 A | 12/2000 |
| JP | 2003267259 A | 9/2003 |
| JP | 2003276402 A | 9/2003 |
| JP | 2004359149 A | 12/2004 |
| JP | 3726558 B2 | 12/2005 |
| JP | 4003082 B2 | 11/2007 |
| JP | 4483206 B2 | 6/2010 |
| KR | 101013676 B1 | 2/2011 |
| KR | 1020120056950 A | 6/2012 |
| WO | 0012327 A1 | 3/2000 |
| WO | 0043642 A1 | 7/2000 |
| WO | 0179007 A1 | 10/2001 |
| WO | 0224471 A1 | 3/2002 |
| WO | 0246031 A1 | 6/2002 |
| WO | 2004014667 A1 | 2/2004 |
| WO | 2009079979 A1 | 7/2009 |
| WO | 2010127985 A1 | 11/2010 |
| WO | 2011047443 A1 | 4/2011 |

(56) References Cited

FOREIGN PATENT DOCUMENTS

| WO | 2011148017 A1 | 12/2011 | |
|---|---|---|---|
| WO | WO-2012102443 A1 * | 8/2012 | ........... B60B 19/003 |
| WO | 2014089642 A1 | 6/2014 | |
| WO | 2016050310 A1 | 4/2016 | |
| WO | 2016109867 A1 | 7/2016 | |

OTHER PUBLICATIONS

PCT International Preliminary Report on Patentability, PCT/AU2016/000001, dated Feb. 28, 2017.
PCT International Search Report, PCT/EP2016/050310, PCT/AU2016/000001, dated Apr. 12, 2016.
PCT International Search Report and Written Opinion, PCT/AU2016/000001, dated Apr. 12, 2016.
Chinese First Office Action for Chinese Application No. 201680007475 dated Aug. 23, 2019, 13 pages with English Translation.
Chinese Search Report for Chinese Application No. 201680007475 dated Aug. 15, 2019, 1 page.

* cited by examiner

WHEEL FRAME COMPONENT

CROSS-REFERENCE TO RELATED APPLICATIONS

This application is a national phase entry under 35 U.S.C. § 371 of International Patent Application PCT/AU2016/000001, filed Jan. 6, 2016 designating the United States of America and published in English as International Patent Publication WO 2016/109867 A1 on Jul. 14, 2016, which claims the benefit under Article 8 of the Patent Cooperation Treaty to Australian Patent Application Serial No. 2015900018, filed Jan. 6, 2015.

TECHNICAL FIELD

This application relates to a wheel frame component. More particularly, this application relates to a wheel frame component forming part of a multiple directional wheel.

BACKGROUND

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of this disclosure of which the identification of pertinent prior art proposals is but one part.

Wheel frames for multiple directional wheels or omni-wheels generally include a hub having a main axis about which the multiple directional wheel is adapted to rotate; a hub rim radially surrounding the hub; a first plurality of peripheral roller supporting arms radially extending from the hub rim in a first plane, and a second plurality of peripheral roller supporting arms, each member arm of the second plurality of peripheral roller supporting arms having a radially inner base and being circumferentially offset with respect to diagonally adjacent members of the first plurality of peripheral roller supporting arms. The diagonally adjacent rollers overlap so that an operable portion of at least one of the rollers is in use in ground contact to enable the wheel to move in both a forward direction normal to the main axis by the rotation of the wheel as a whole about the main axis, and in a lateral direction having a vector component parallel to the main axis by the rotation of the at least one round contacting roller. The cost of manufacture of prior art multiple directional wheel frames is high, both in terms of time and materials. Inadequate ride quality is another factor in which prior attempts do not excel. Ride quality is directly related to roller pass-off length. Also, prior art attempts suffer from poor roller axle housing fit and impact resistance. These result in substantial wear and deterioration of the wheel and its performance: loosening axle mounts and impact damage discourage use of multiple applications where there is a low tolerance to mechanical failure or deterioration in performance. Furthermore, prior attempts tend to use metal components, such as axles, in engagement with moving components made of softer or weaker materials, thereby increasing cost and the likelihood of mechanical failure or accelerated wear and tear. It would be advantageous to provide a wheel frame that ameliorates one or more of the aforementioned disadvantages of the prior art or to at least provide a useful alternative thereto.

BRIEF SUMMARY

The disclosure, according to one or more aspects, is as defined in the independent claims. Some optional and/or preferred features of the disclosure are defined in the dependent claims.

Accordingly, in one aspect of the disclosure, there is provided:

a component for a wheel frame for a multiple directional wheel, the wheel frame component comprising:
- a hub having a main axis about which the multiple directional wheel is adapted to rotate;
- a hub rim radially surrounding the hub;
- a first plurality of peripheral roller supporting arms radially extending from the hub rim and lying in a first plane,
- a second plurality of peripheral roller supporting arms, each member arm of the second plurality of peripheral roller supporting arms having a radially inner base and being circumferentially offset with respect to diagonally adjacent members of the first plurality of peripheral roller supporting arms, wherein:
- the wheel frame component comprises a plurality of beams corresponding to the number of member arms of the second plurality of peripheral roller supporting arms, each member arm of the second plurality of peripheral roller supporting arms having an inner base; and
- the second plurality of peripheral roller supporting arms lie in a second plane normal to the main axis, spaced from, and parallel to, the first plane, wherein each of the plurality of beams are cantilevered from the hub rim, are substantially linear and aligned parallel to the main axis, extending from the hub rim to the corresponding inner base of the member arm.

In another aspect, the disclosure provides:

a multiple directional wheel including a wheel frame comprising identical component parts, wherein each of the wheel frame components comprise:
- a hub having a main axis about which the multiple directional wheel is adapted to rotate;
- a hub rim radially surrounding the hub;
- a first plurality of peripheral roller supporting arms radially extending from the hub rim and lying in a first plane; and
- a second plurality of peripheral roller supporting arms, each member arm of the second plurality of peripheral roller supporting arms having a radially inner base and being circumferentially offset with respect to diagonally adjacent members of the first plurality of peripheral roller supporting arms, each of the wheel frame components further comprising a plurality of beams corresponding to the number of member arms of the second plurality of peripheral roller supporting arms, each respective beam extending from the hub rim to a corresponding inner base of a member arm of the second plurality of peripheral roller supporting arms, and a plurality of spigots extending from each corresponding one of the beams or the inner bases; and the second plurality of peripheral roller supporting arms lying in a second plane normal to the main axis, spaced from, and parallel to, the first plane;

wherein:
each of the plurality of beams are cantilevered from the hub rim, are substantially linear and aligned parallel to the main axis, extending from the hub rim to the corresponding inner base of the member arm;

each of the spigots is received in a recess formed in a facing surface of a complementary one of the wheel frame components to join the wheel frame components to form the wheel frame;

aligned in series and substantially linearly aligned, are the hub rim, the extending beam end-on-end, and the inner base of a transversely and radially extending second arm and an elongate spigot.

The wheel can be used for both driven and free-rolling conveyor transfer systems, inspection tables, ball transfer stations, as a robotic wheels or other wheel applications, particularly where caster wheels are employed.

The wheel frame components may be identical or different, but are preferably identical to reduce manufacturing costs. The wheel frame, once assembled, may comprise two or more wheel frame components. The wheel frame is preferably formed from identical half wheel frame components. The wheel frame components may be formed by molding, casting, 3-D printing, laser cutting, such as by using a CNC machine, and other forms of manufacture of 3-D objects known to the person skilled in the art. Preferably, the wheel frame is formed from polymeric material, such as acetal, reinforced polypropylene and other suitable polymer materials. The wheel frame may also be formed from metallic materials, such as various grades of steel, depending on corrosion and strength-resistance properties required of the wheel. In a preferred embodiment, the wheel is made from lighter polymeric materials.

Preferably, the frame is molded from ABS or acetal. By providing a standard cylindrical hub bore adapted to receive a variety of alternative hub bore inserts, the wheel may be suited to many different applications. For example, the various hub inserts may define a bore varying between 4.8 mm, 6 mm and 8 mm in diameter. The hub insert may define a polygonal or cross-shaped axial bore. The hub insert is preferably in the form of a bushing. The hub insert may comprise a pair of opposable bushings, each engageable with the hub or each other, to form spaced axial bore openings.

The first component has a frame, which includes the rim forming a circular ring from which radially extend the first support arms, cantilevered beams extending axially parallel from the rim to support the second support arms, also extending radially but axially offset from the ring and extending radially from the remote end of each beam, the first supporting arms circumferentially offset from the second supporting arms, a spigot extending from a base of each second supporting arm, and a recess formed in the base of each first supporting arm to receive an opposed spigot of a like and mating second component.

The rollers may be unitarily or integrally formed as a single piece comprising a solid body. Each roller may have a pair of end-protruding axial stubs that respectively engage spaced opposing support heads. The rollers so formed may be made from substantially rigid polymer, such as nylon or polyurethane, the latter being suitable where high cut and tear resistance is desirable as such may be required for industrial applications.

Alternatively, where a soft roller material is required for greater traction or quieter ride properties, the rollers may be over-molded as described in the Applicant's published patent application No. WO2011047443, the disclosure of which is hereby incorporated herein in its entirety by this reference. Over-molding of the rollers may be performed over axles of a harder and more rigid material suitable for forming a structural component, such as acetal. In any case, although forming the wheel from one or more metal components is within the scope of the disclosure, where the rollers and frame are made from polymeric materials, then preferably, the components, such as axles constituting or being engaged with relative moving parts, are made from materials other than metals to minimize relative abrasion and early onset of wear- and tear-related performance failures.

The wheel hub may be circular and adapted to receive and/or engage an axle, journal, bearings and/or drive shaft. In this connection, the spigots extending in an axially parallel direction from one wheel frame component may extend into and through the corresponding recesses of a second wheel frame component. The recesses may be keyed using a keyway spline. The recesses may be polygonal in section and adapted to receive a spigot in a press or interference fit.

The recesses may be cavities recessed into the second wheel frame component structure. Alternatively, the recesses may be bores or apertures that extend fully through the second wheel frame component. The spigots may extend through the bore or aperture and protrude proud on the other side of the second wheel frame component.

A drive means may be mounted to the wheel. The wheel may include a drive engagement device to operatively connect the rotation of the wheel about the main axis to the drive means. The protruding spigots may then be used to mount the drive means.

The drive means may be in the form of a sprocket having corresponding recesses to receive the protruding spigots. The drive means may include a gear assembly to enable the relative rotation ratios of the wheel compared to a drive shaft to be changed as required. The drive means may include a drive motor operably connected to the drive means. The drive means may include an internal plate adapted to face and abut the adjacent wheel frame component.

The drive means may engage the wheel by being keyed to operatively engage profiled or keyway defining bores. Alternatively, the drive means may include hub engaging tines. The hub engaging tines may be deflectable. The tines may be engageable in a corresponding recess or recesses formed in close association to the hub. The hub engaging tines may be arranged in a circle whereby to be inserted into the circular hub of the adjacent wheel frame component. The tines may be equally spaced. There may be two or more tines constituting the hub engagement device. The tines may each have a curved shape. The tines engaging a particular hub may form a set of tines that collectively are in the shape of a broken circle with arc gaps that define the sides of the tines. The curved tines are preferably adapted to engage complementary recesses formed in the hub rim outer face. The spigots preferably only partially extend from the first wheel frame component into the drive means. The spigots preferably do not fully extend through from the first wheel frame component to the drive means.

The rollers comprise tyres formed in a truncated fusiform or barrel shape. Each roller comprises an axle. The axle is preferably coaxial with respect to the roller. The axle preferably extends through an axial bore in the roller. The axle preferably extends beyond either end of the roller. Each roller axle can preferably engage a head of a peripheral roller supporting arm. The head is preferably located at a radially outward periphery or rim of the wheel.

Each roller axle may have a roller bushing. The roller bushing may be discretely formed. Alternatively, the roller bushing may be in the form of a wider cylindrical bushing.

The axle may be either unitarily or integrally molded with the wider cylindrical bushing. The wider cylindrical bushing may be enveloped or sleeved by the outer roller tyre. The roller tyre may be molded or otherwise applied about the wider cylindrical bushing. The wider cylindrical bushing may be separately applied to the roller axle. Preferably, in order to minimize costs, the roller axle and the roller bushing are a unitary piece molded as a single component for each roller. The roller axle and bushing may, therefore, be made of a strong and relatively inflexible material, such as reinforced or hardened polymeric material.

Advantageously, a single-piece molded roller core incorporating the axle pins/heads may be used. Alternatively, the roller may comprise a full solid piece roller. In another alternative, a roller undersized in diameter may be used, which can be over-molded with selected materials adapted for improved wear and tear resistance, non-marking or improved traction, etc., or other desirable roller ground-engaging properties.

Each of the peripheral roller supporting arms may extend radially outwardly. The peripheral roller supporting arms may terminate at a radial extent close to the radial periphery of the wheel. The radial periphery corresponding to the outer extent of the wheel may be defined by the rollers when the wheel is viewed in side profile.

Each head, when viewed from a side in the line of the main axis, may comprise a substantially triangular body comprising recesses on either of its isosceles angled sides to receive roller axle pins extending from the rollers. Each head may be completed upon assembly of the component parts of the wheel frame. The head may include an outer peripheral engagement means to further secure the engagement of the component wheel frame parts.

The peripheral roller supporting arms may include a radial shaft extending from the hub rim to the head and may comprise a wide base adjacent the hub rim that tapers toward the head.

During assembly, the rollers may be press fitted into their respective opposed and spaced support head mounts so adjacent radial heads assist in retaining the roller during assembly.

The radial heads preferably include modified structural features to ensure a tighter fit with minimal opportunity for gaps between respective opposed engaged surfaces. Advantageously, each opposed part adapted to form each head comprises a substantially planar surface interrupted by a marginally raised region proximal to the outer periphery. One or both facing surfaces may be so raised, so that the radially inward region of the opposed faces is adapted to flex and urge the opposed parts into flush engagement. The outer periphery of each pair of support heads may have complementary male and female fitting features, including a flange on one and a corresponding recess on the other.

The shaft may include an inner facing recess to receive an axially aligned spigot. The inner facing recess may be polygonal in shape. Preferably, the inner facing recess is hexagonal in shape. Preferably, the spigots are round in section. The diameter of the spigots is progressively stepped or tapered intermediate their respective lengths. Accordingly, the round-shaped spigot in section may be inserted into the hexagonal inner recess for a tight interference fit. The spigot may have a base with a wider diameter than a terminal or free end of the spigot. The base of the spigot may provide an interference fit in the inner facing recess. The narrower or smaller dimensioned terminal end of the spigot, which may have a smaller diameter, may extend partially or fully through the opposed wheel frame component. The spigot may extend fully through and out the other side for engagement with the drive means in some embodiments of the disclosure.

Advantageously, the spigots are preferably short stubs of a constant cross-section or constantly graded cross-section. The spigots may, therefore, not include a stepped shaft profile. Preferably, the entire length of the spigot provides an engagement surface in the corresponding receiving bore of the recess for a non-releasable friction fit. Preferably, the recess is a blind hole to minimize fatigue and mechanical failure risks in small-frame components and for aesthetic reasons. However, in large wheel frames where the recess is formed in a greater body of material, through-holes may be desirable for the recesses as described above.

The spigots, therefore, may provide complimentary fastening devices in the form of axial bolts or studs that mechanically join to complimentary recesses in an interference fit. Preferably, the fastening devices extend parallel to the main axis. Each fastening device may extend substantially parallel to a corresponding beam. One or more of the fastening devices may extend substantially coaxially relative to a corresponding beam.

Each beam is preferably cantilevered and extends in parallel axial alignment, that is, substantially parallel to the main axis from the hub rim. The beam may be polygonal in section. The beam is preferably trapezoidal in section. Still more preferably, the beam may be isosceles trapezoidal in section in which a large elongate, substantially rectangular and parallel face corresponds to the outer perimeter of the hub rim. A small parallel face may correspond to the inner periphery of the hub rim.

Accordingly, the linear structure of the hub rim, the beam and the spigot in series is very strong. In its preferred form, it provides a strong and rigid inner structure of the hub rim of the wheel frame. When the wheel is coupled to the drive means, the drive means is preferably engaged through the strongest part of the wheel frame for the most efficient and effective transfer of power to the wheel. The beam is sufficiently long to extend axially parallel radially inwardly relative to a corresponding roller. The length of each beam allows space for a member of the second plurality of peripheral roller supporting arms to extend radially outwardly within the wheel's and the assembled wheel frame's side profile. Each member of the second plurality of peripheral roller supporting arms comprises a radial shaft with a wide base at the inner base tapering radially outwardly to a peripheral roller supporting head. The head preferably faces in the same direction as the offset and diagonally adjacent heads of the first plurality of peripheral roller supporting arms.

Accordingly, by providing a pair of like wheel frame components facing each other and registered so that their respective spigots are received by their corresponding opposed inner recesses, the wheel frame components may be mechanically brought together in an interference fit and engaged to form a unitary wheel frame. Optionally, the wheel frame, hub or central bore interface can further have a drive means mounted to it. The interference fit may be mechanically sufficient to robustly join the pair of components or further reinforcement in the form of adhesive or welding, or a combination of both, may be desirable. Welding may be in the form of ultrasonic welding. Preferably, respective engagement of the pair of components is achieved with only interference fit and no further adherence means.

BRIEF DESCRIPTION OF THE DRAWINGS

The disclosure may be better understood from the following non-limiting description of preferred embodiments, in which:

FIG. 8, Panels (a)-(d), show perspective views of alternative bushings for fitting to the third embodiment;

DETAILED DESCRIPTION

Preferred features of this disclosure will now be described with particular reference to the accompanying drawings. However, it is to be understood that the features illustrated in and described with reference to the drawings are not to be construed as limiting on the scope of the invention.

Figure 1:
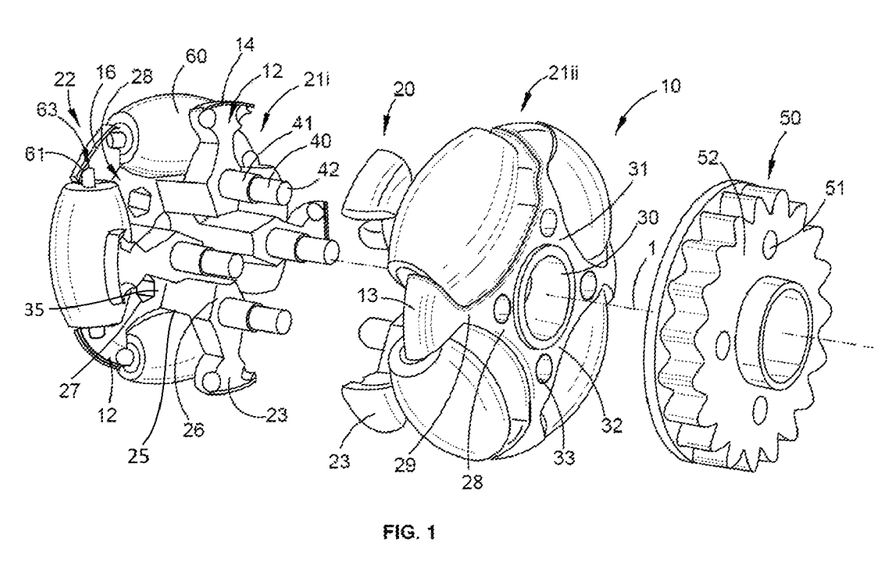
FIG. 1 is a perspective exploded view of a wheel according to a first embodiment of the disclosure.

Referring to FIG. 1, there is shown a multiple directional wheel 10 including a wheel frame 20 comprising identical component parts 21$i$ and 21$ii$. Each of the wheel frame components 21$i$ and 21$ii$ comprise: a hub 30 having a main axis 1 about which the multiple directional wheel 10 is adapted to rotate; a hub rim 31 radially surrounding the hub 30; a first plurality (four shown) of peripheral roller supporting arms ("first arms") 22 radially extending from the hub rim 31 and aligned in a first plane; and a second plurality of peripheral roller supporting arms ("second arms") 23, each member arm of the second plurality of peripheral roller supporting arms having a radially inner base 26 and being circumferentially offset with respect to diagonally adjacent members of the first plurality of peripheral roller supporting arms 22. Each of the wheel frame components 21$i$ and 21$ii$ further comprise a plurality of beams 25 corresponding to the number of member arms of the second plurality of peripheral roller supporting arms 23, each respective beam 25 extending from the hub rim 31 to a corresponding inner base 26 of a member arm of the second plurality of peripheral roller supporting arms 23, and a plurality of spigots 40 extending from each corresponding one of the beams 25 or the inner bases 26. The second plurality of peripheral roller supporting arms 23 lie in a second plane normal to the main axis 1, spaced from, and parallel to, the first plane; and each of the spigots 40 from one of the wheel frame components 21$i$ and 21$ii$ is received in a recess 27 formed in a facing surface 35 of a complementary one of the wheel frame components 21$i$ and 21$ii$ to join the wheel frame components 21$i$ and 21$ii$ to form the wheel frame 20.

The hub rim 31 defines a circular hub 30. The frame 20 of the eight-roller wheels 10-10$c$ is star-shaped and has concave curved walls 32 (shown also as 32$c$ in line with the reference number scheme for the corresponding feature in FIGS. 5 and 7) extending between and forming part of the first arms 22. The star-shape facilitates the provision of a wide base 28, first arm 22 tapering through its shaft 29 to first roller axle mounting heads 12.

Each of the beams 25 is a thick structure substantially consistent in thickness throughout its length from the hub rim 31 to its corresponding inner base 26, although the skilled person may appreciate that some variation may achieve optimization of strength while minimizing materials. The beam 25 is substantially linear and aligned parallel to the main axis 1. Aligned in series and substantially linearly aligned are the hub rim 31, the extending beam 25 end-on-end, the inner base 26 of a transversely extending second arm 23 and an elongate spigot 40. The beam is cantilevered from the hub rim 31 and this structure allows for the minimization of materials, while permitting easy assembly of the wheel 10 by allowing the rollers to be first inserted and then secured and trapped once assembled. The assembled wheel 10 provides an extremely robust and rigid hub rim 31 and inner base 26 structure by consistently maintaining the thickness of the hub rim 31 and cantilevered beam 25 through a linear direction parallel to the main axis 1.

The spigot 40 is stepped, having variable diameter between a wider spigot base 41 and a thinner protruding terminal end 42. The spigot base 41 is adapted to be received in a strong mechanical interference and non-releasable fit in a corresponding recess 27, so that the terminal end 42 extends proud beyond the other side of the complementary other wheel frame component 21$ii$ through hole 33 that is continuous with the recess 27.

The proud terminal end 42 of the spigot 40 may be used to engage a drive device such as a set of gears, a drive motor or a sprocket 50 as shown in FIG. 1 by inserting the spigot end 42 into one of a plurality of through-apertures 51 formed in a body 52 of the sprocket 50.

The respective roller axle supporting head parts 12 comprise substantially isosceles triangular bodies with axle pins 61 of rollers 60 being received in shallow, half-spherical axle pin recesses 63. Only upon the assembly of the two half components 21$i$ and 21$ii$ is each head 12 completed and the roller axle pins 61 secured and trapped in their respective completed recesses 63. The head parts 12 comprise peripheral complementary engagement portions in the form of a male tongue or flange 14 formed in the facing head 13 of the first component 21$i$ and curved to follow the contour of the outer wheel rim and a complementarily curved female groove 16 formed in the head 12 of the second component 21$ii$.

Figure 2:
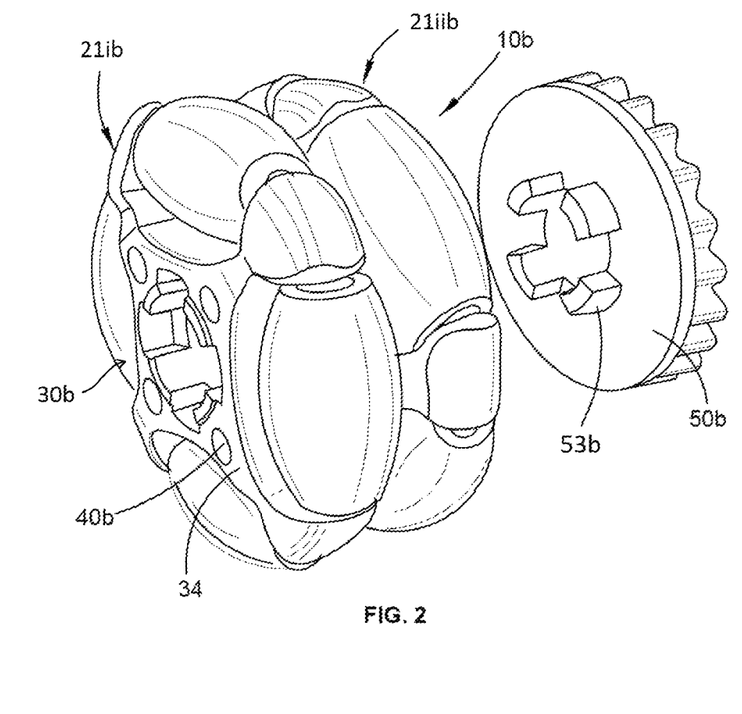
FIG. 2 is a perspective exploded view of a wheel frame according to a second embodiment of the disclosure.
Figure 3:
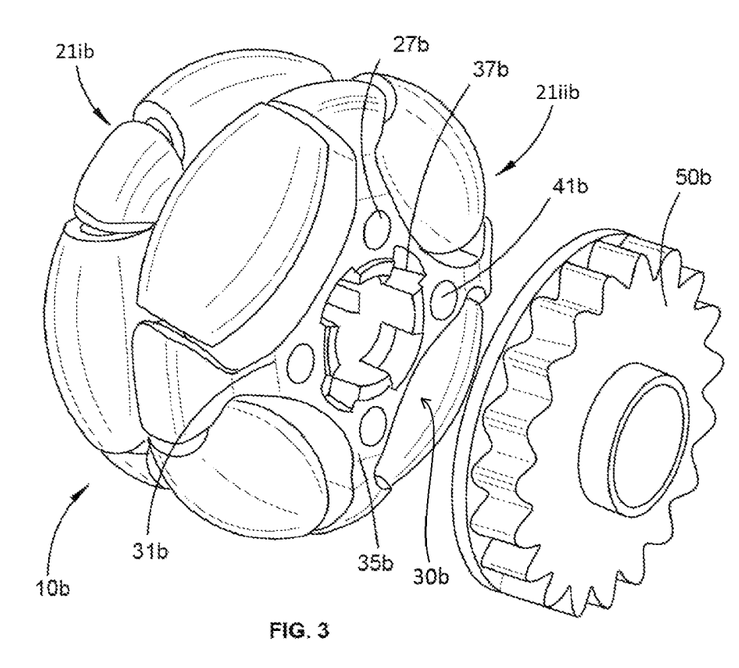
FIG. 3 is a perspective view of the second embodiment shown from a different angle.
Figure 4:
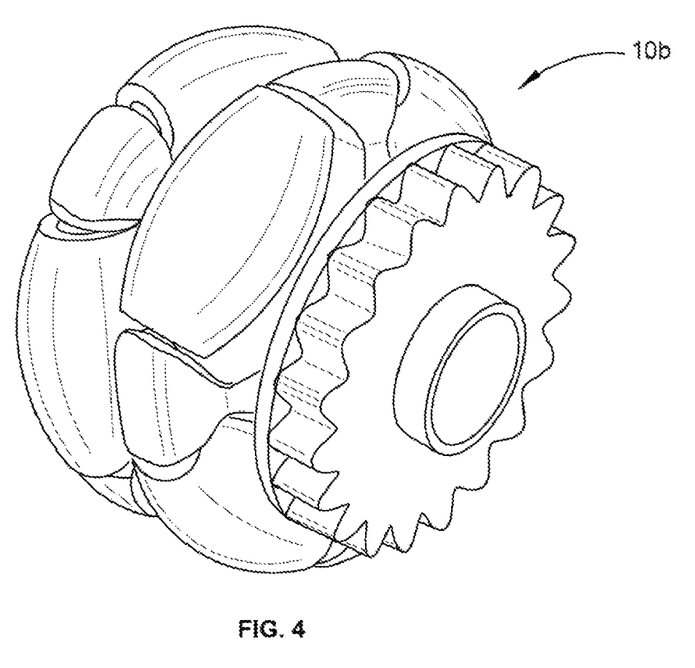
FIG. 4 is a perspective view of an assembled wheel according to either the first or second embodiment shown in FIG. 1 or 2.

With reference to FIGS. 2 through 4, in describing the various components in the second embodiment, like features will be referenced with the same reference number plus the letter "b". A variation of the embodiment shown in FIG. 1 is provided in which a wheel 10$b$ is substantially similar to the wheel 10, but has a different hub 30$b$ shape and spigot 40$b$ shapes. The spigots 40$b$ are not stepped but terminate with a thick base portion (corresponding to portion 41 of the spigot 40 shown in FIG. 1) and extend from a first wheel frame component 21$ib$ only to the extent that they end flush with an outer wall 34 of a second wheel frame component 21$iib$. Similarly, complementary spigots 41$b$ extending from wheel frame component 21$ib$ extend through recesses 27$b$ in wheel frame component 21$iib$ and end flush with an outer wall 35$b$ of wheel frame component 21$iib$. The hub rims 31$b$ of the wheel frame components 21$ib$, 21$iib$ comprise wedged cut-out recesses 37$b$ that are adapted to form the cooperating recess for complementary-shaped tines or fingers 53$b$ provided in the unitary molding of a second form of sprocket 50$b$ adapted to engage directly with the hub rim 31$b$, so that the spigots 40$b$, 41$b$ are not required to attach the sprocket 50$b$. The tines 53$b$ are arranged in a circular pattern and are equi-spaced to be inserted and to be received in a mechanical interference fit in the corresponding wedge-shaped recesses 37b so that the sprocket 50b or other suitable drive means may be engaged or mounted to the wheel 10b for rotation therewith as shown in FIG. 4.

Additional embodiments shown with reference to FIGS. 5-8 will now be described wherein similar corresponding features are identified by like reference numbers plus the letter "c".

A wheel 10c in assembled form will be described with reference to FIGS. 5-10 in which the recesses 27c receiving spigots 40c are blind recesses shown in broken lines to indicate that they are hidden from external view and sealed at one end to preserve the strength and integrity of the frame 20c structure surrounding the recesses 27c.

Figure 5:
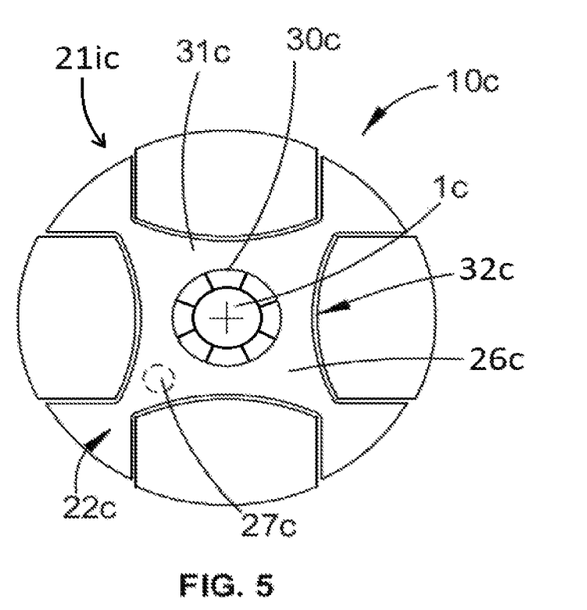
FIG. 5 is a side view of the wheel according to a third embodiment.

The spigots 40c are of constant cross-section and are not stepped, thereby maximizing the engagement surface and friction fit with the wall of the recesses 27c.

Figure 10:
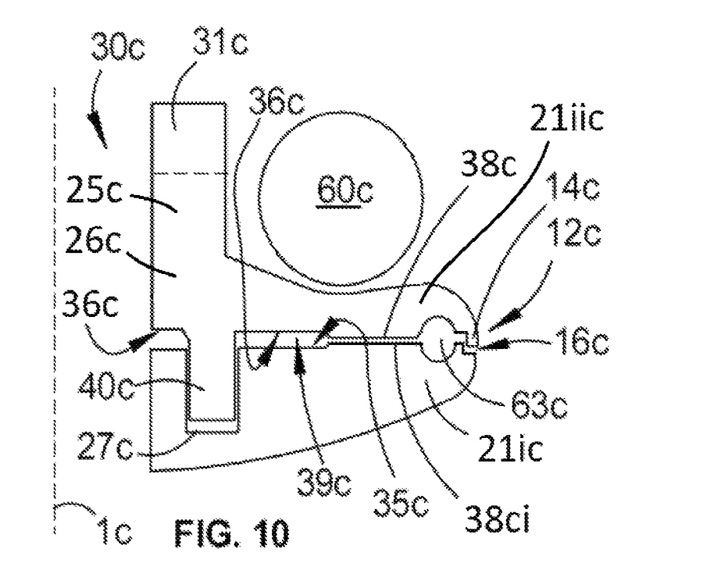
FIG. 10 is a schematic cross-sectional view of a support post of a wheel made according to the third embodiment.

The respective components 21ic and 21iic face each other at opposing surfaces 35c, 36c when engaged to one another as shown in FIG. 10. The faces 35c, 36c are raised at the radially outer region 38ci, 38c of the head 12c radially inwardly adjacent the pin recesses 63c, thereby creating a shallow radially inward cavity 39c between opposed surfaces 35c and 36c. This gap 39c facilitates greater adherence of the respective components 21ic, 21iic to each other, permitting flexing about the raised surfaces and into the cavity 39c.

Figure 6:
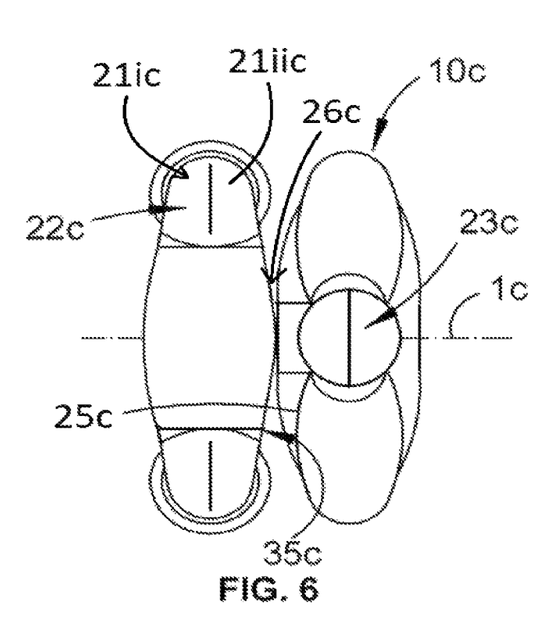
FIG. 6 is an end view of the wheel according to the third embodiment together with a bushing.

The peripheral rim of the first component 21ic has a male flange 14c that cooperates with a female recess or ledge 16c to facilitate engagement of the respective components 21ic, 21iic. FIG. 10 shows that the third embodiment shares with the first embodiment the features of a beam 25c terminating at one end by a facing surface 35c and extending to a radially inner base 26c. Likewise, a first plurality of peripheral roller supporting arms 22c and a second plurality of peripheral roller supporting arms 23c are shown in FIG. 6.

Figure 9:
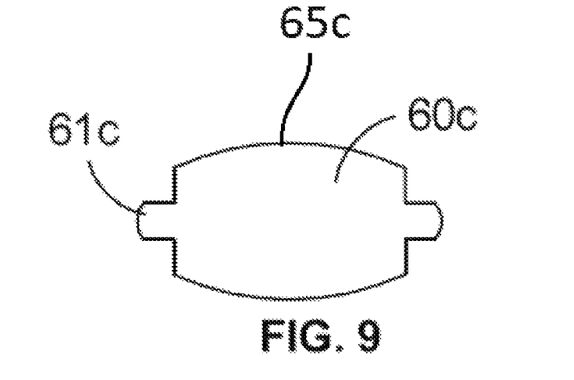
FIG. 9 is a schematic side view of a solid molded roller.

The rollers 60c are solid unitary structures formed from a single molding and made from a homogenized material, such as polyurethane and other polymeric materials that have a high cut, tear and sheer strength. Softer materials offering greater traction and able to be over-molded onto a roller bush axle substrate may be suitable in certain applications. As shown in FIG. 9, the rollers 60c may be unitarily or integrally formed from a single piece including a solid, barrel-shaped body 65c and a pair of spaced, coaxial, end pins 61c adapted to be received in the cup-shaped recesses 63c formed by the components 21ic and 21iic.

Figure 7:
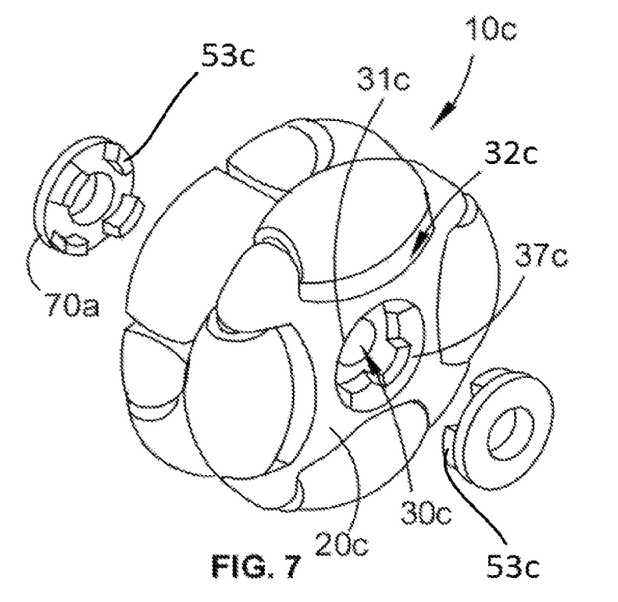
FIG. 7 is an exploded perspective view of the wheel shown in FIG. 6.
Figure 8:
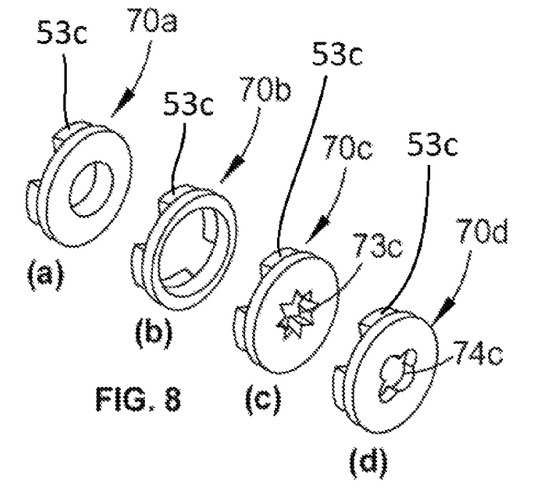

As shown in FIGS. 7 and 8, the shape of the axle bore 30c can be modified by substituting any on a range of different bushings 70a-70d, each having tines 53c, thereby engaging with reciprocal recesses 37c to connect to the rim 31c. The bushings 70a and 70b have varying bores in the range of 4.8 mm-8.0 mm, although other sizes will be considered to fall within the scope of the disclosure, thereby being able to be flexibly adapted to fit larger or smaller axles, bearings and journals. The axles extending through the main bore 30c, having a main axis 1c, may be keyed to ensure that the frame 20c rotates with the main axle. Bushing 70c has a star-shaped bore profile 73c, whereas the bore of bushing 70d has a four-leaf clover keyed shape 74c.

Throughout the specification and claims, the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus," "means," "device" and "member" may refer to singular or plural items and are terms intended to refer to a set of properties, functions or characteristics performed by one or more items or components having one or more parts. It is envisaged that where an "apparatus," "means," "device" or "member" or similar term is described as being a unitary object, then a functionally equivalent object having multiple components is considered to fall within the scope of the term, and similarly, where an "apparatus," "assembly," "means," "device" or "member" is described as having multiple components, a functionally equivalent but unitary object is also considered to fall within the scope of the term, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the wheel shown upright and the main axis aligned horizontally.

It will be appreciated by those skilled in the art that many modifications and variations may be made to the methods of the disclosure described herein without departing from the spirit and scope of the invention.

The claims defining the invention are as follows:

1. A component for a wheel frame for a multiple directional wheel, the wheel frame component comprising:
   a hub having a main axis about which the multiple directional wheel is adapted to rotate;
   a hub rim radially surrounding the hub;
   a first plurality of peripheral roller supporting arms radially extending from the hub rim and lying in a first plane,
   a second plurality of peripheral roller supporting arms, each peripheral roller supporting arm of the second plurality of peripheral roller supporting arms being circumferentially offset with respect to diagonally adjacent peripheral roller supporting arms of the first plurality of peripheral roller supporting arms,
   wherein:
      the wheel frame component comprises a plurality of beams corresponding to the number of peripheral roller supporting arms of the second plurality of peripheral roller supporting arms, each peripheral roller supporting arm of the second plurality of peripheral roller supporting arms having a radially inner base; and
      the second plurality of peripheral roller supporting arms lie in a second plane normal to the main axis, spaced from, and parallel to, the first plane,
   wherein each of the plurality of beams are cantilevered from the hub rim, are substantially linear and aligned parallel to the main axis, extending from the hub rim to the corresponding radially inner base of the peripheral roller supporting arm of the second plurality of peripheral roller supporting arms.

2. The component as claimed in claim 1, wherein the wheel comprises a cylindrical hub bore adapted to receive a variety of alternative hub bore inserts in the form of a bushing.

3. The component as claimed in claim 2, wherein hub inserts include a pair of opposable bushings, each engageable with the hub, to form spaced axial bore openings.

4. The component as claimed in claim 1, wherein the wheel comprises an axle bore, modified by substituting a range of different bushings, each having tines thereby to engage with reciprocal recesses to connect to the hub rim.

5. A multiple directional wheel including a wheel frame comprising identical component parts, wherein each of the wheel frame components comprise:
   a hub having a main axis about which the multiple directional wheel is adapted to rotate;
   a hub rim radially surrounding the hub;
   a first plurality of peripheral roller supporting arms radially extending from the hub rim and lying in a first plane; and
   a second plurality of peripheral roller supporting arms, each peripheral roller supporting arm of the second plurality of peripheral roller supporting arms having a radially inner base and being circumferentially offset with respect to diagonally adjacent peripheral roller supporting arms of the first plurality of peripheral roller supporting arms,
   each of the wheel frame components further comprising a plurality of beams corresponding to the number of peripheral roller supporting arms of the second plurality of peripheral roller supporting arms, each respective beam extending from the hub rim to a corresponding radially inner base of a peripheral roller supporting arm of the second plurality of peripheral roller supporting arms, and a plurality of spigots extending from each corresponding one of the beams or the radially inner bases; and
   the second plurality of peripheral roller supporting arms lying in a second plane normal to the main axis, spaced from, and parallel to, the first plane;
   wherein:
      each of the plurality of beams are cantilevered from the hub rim, are substantially linear and aligned parallel to the main axis, extending from the hub rim to the corresponding radially inner base of the peripheral roller supporting arm of the second plurality of peripheral roller supporting arms;
      each of the spigots is received in a recess formed in a facing surface of a complementary one of the wheel frame components to join the wheel frame components to form the wheel frame; and
      aligned in series and substantially linearly aligned, are the hub rim, the extending beam end-on-end, and the radially inner base of a transversely and radially extending peripheral roller supporting arm and an elongate spigot.

6. The multiple directional wheel as claimed in claim 5, wherein the multiple directional wheel further includes support heads, and rollers are unitarily or integrally formed as a single piece comprising a solid body and a pair of end protruding axial stubs that are respectively adapted to engage the support heads.

7. The multiple directional wheel as claimed in claim 5, wherein the spigots extend in an axially parallel direction from one wheel frame component, and into corresponding recesses of the second wheel frame component.

8. The multiple directional wheel as claimed in claim 7, wherein the recesses may be keyed using a keyway spline and adapted to receive the spigot in a press or interference fit.

9. The multiple directional wheel as claimed in claim 8, wherein drive means is mounted to the wheel and is operatively connected to rotate with the wheel about the main axis.

10. The multiple directional wheel as claimed in claim 9, wherein the drive means engages the wheel by being keyed to operatively engage profiled or keyway defining bores.

11. The multiple directional wheel as claimed in claim 9, wherein the drive means includes hub engaging tines to engage the drive means to the wheel, the hub engaging tines engageable in a corresponding recess or recesses formed in the hub.

12. The multiple directional wheel as claimed in claim 11, wherein the hub engaging tines are arranged in a circle whereby to be inserted into the hub of the adjacent wheel frame component.

13. The multiple directional wheel as claimed in claim 5, wherein support heads are formed by the identical component parts and each support head comprises a substantially planar surface interrupted by a marginally raised region proximal to an outer periphery of each of the support heads.

14. The multiple directional wheel as claimed in claim 13, wherein substantially planar surfaces are raised relative to a radially inward region of the substantially planar surfaces whereby the substantially planar surfaces are adapted to flex and urge the opposed parts into flush engagement under tension.

* * * * *